(12) United States Patent
Zhang et al.

(10) Patent No.: US 12,410,545 B2
(45) Date of Patent: Sep. 9, 2025

(54) CONTROL METHOD FOR SMART HOME SYSTEM

(71) Applicants: QINGDAO HAIER WASHING MACHINE CO., LTD., Shandong (CN); Haier Smart Home Co., Ltd., Shandong (CN)

(72) Inventors: Shuxia Zhang, Shanghai (CN); Zhenxing Huang, Shanghai (CN); Sheng Xu, Shanghai (CN)

(73) Assignees: QINGDAO HAIER WASHING MACHINE CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 376 days.

(21) Appl. No.: 18/253,657

(22) PCT Filed: Oct. 27, 2021

(86) PCT No.: PCT/CN2021/126753
§ 371 (c)(1),
(2) Date: May 19, 2023

(87) PCT Pub. No.: WO2022/068951
PCT Pub. Date: Apr. 7, 2022

(65) Prior Publication Data
US 2024/0003073 A1    Jan. 4, 2024

(30) Foreign Application Priority Data
Nov. 19, 2020   (CN) .......................... 202011302965.8

(51) Int. Cl.
*D06F 33/37* (2020.01)
*D06F 34/22* (2020.01)
(Continued)

(52) U.S. Cl.
CPC .............. *D06F 33/37* (2020.02); *D06F 34/22* (2020.02); *G05B 15/02* (2013.01); *D06F 39/02* (2013.01);
(Continued)

(58) Field of Classification Search
CPC .......... D06F 33/30; D06F 33/32; D06F 33/36; D06F 33/37; D06F 33/46; D06F 33/50;
(Continued)

(56) References Cited

U.S. PATENT DOCUMENTS

| 9,739,004 B2 * | 8/2017 | Ha .......................... D06F 33/37 |
| 2009/0009287 A1 | 1/2009 | Falcioni et al. |
| 2020/0354877 A1 * | 11/2020 | Amador Zamarreno ..................... D06F 33/36 |

FOREIGN PATENT DOCUMENTS

| CN | 105320044 A | 2/2016 |
| CN | 108536026 A | 9/2018 |

(Continued)

OTHER PUBLICATIONS

International Search Report dated Jan. 27, 2022, in corresponding International Application No. PCT/CN2021/126753, 5 pages.

*Primary Examiner* — Crystal J Barnes-Bullock
(74) *Attorney, Agent, or Firm* — Maier & Maier, PLLC

(57) ABSTRACT

A control method for a smart home system, the smart home system comprising a smart socket and a laundry treatment device. The laundry treatment device is electrically connected to the smart socket. The control method includes: measuring electricity consumption parameters of a laundry treatment device by a smart socket; determining operation information of the laundry treatment device according to the electricity consumption parameters; determining the amount of detergent consumed by the laundry treatment device according to the operation information; and calculating a remaining amount of the detergent in the laundry treatment (Continued)

device according to the amount of detergent consumed; and based on a calculation result, selectively giving an insufficient detergent prompt by a reminding apparatus.

10 Claims, 3 Drawing Sheets

(51) Int. Cl.
  *G05B 15/02*    (2006.01)
  *D06F 39/02*    (2006.01)
  *D06F 103/18*   (2020.01)
  *D06F 105/60*   (2020.01)
(52) U.S. Cl.
  CPC ...... *D06F 2103/18* (2020.02); *D06F 2105/60* (2020.02); *G05B 2219/2642* (2013.01)
(58) Field of Classification Search
  CPC .......... D06F 33/52; D06F 33/56; D06F 33/57; D06F 33/72; D06F 39/02; D06F 39/022; G05B 15/02
  USPC .................................. 700/83, 275, 281, 283
  See application file for complete search history.

(56) References Cited

FOREIGN PATENT DOCUMENTS

| | | | | |
|---|---|---|---|---|
| CN | 110376429 | A | 10/2019 | |
| CN | 110904612 | A | 3/2020 | |
| CN | 111338262 | A | 6/2020 | |
| CN | 211446297 | U | 9/2020 | |
| KR | 20060024579 | A * | 3/2006 | ............. D06F 34/18 |

\* cited by examiner

CONTROL METHOD FOR SMART HOME SYSTEM

FIELD

The present disclosure belongs to the technical field of smart home, and specifically provides a control method for a smart home system.

BACKGROUND

At present, clothing treatment apparatuses such as pulsator washing machines, drum washing machines and washing-drying integrated machines have already become essential home appliances for each and every family. The clothing treatment apparatuses are used by people to wash and dry clothing, shoes and other objects, which can quickly and efficiently wash and dry clothing, shoes and other objects, meet people's fast-paced living requirements, and provide more conveniences for people's lives.

As the scientific and technological level continuously develops and becomes mature, the clothing treatment apparatuses are gradually developing toward the direction of the Internet of Things (IoT) rapidly, and IoT clothing treatment apparatuses that are more intelligent and convenient are gradually entering the market. IoT clothing treatment apparatuses can interact and communicate with cloud servers through wireless networks, and the cloud servers can analyze through big data and control IoT clothing treatment apparatuses to perform corresponding operations more intelligently and reasonably. However, currently, the clothing treatment apparatuses used in most homes are still non-IoT clothing treatment apparatuses, and users are not able to experience the convenience brought by IoT washing machines. For example, for non-IoT washing machines, during daily use, users cannot use the Internet of Things system to timely notice that the remaining amount of detergent in a detergent dispenser of the washing machine is insufficient, and cannot replenish the detergent in the detergent dispenser of the washing machine in a timely manner. Therefore, a situation may easily occur in which the clothing is not washed clean after clothing washing without noticing that the detergent is insufficient, and users need to use the washing machine to wash the clothing again after replenishing the detergent, which causes major inconvenience to users. Therefore, the user experience needs to be improved for users.

Accordingly, there is a need for a new technical solution in the art to solve the above problem.

SUMMARY

In order to solve the above problem in the prior art, that is, to solve the problem that existing non-IoT washing machines are not able to timely remind replenishment of the detergent, the present disclosure provides a control method for a smart home system; the smart home system includes a smart socket and a clothing treatment apparatus, and the clothing treatment apparatus is electrically connected with the smart socket; the control method includes: detecting electricity consumption parameters of the clothing treatment apparatus through the smart socket; determining operation information of the clothing treatment apparatus based on the electricity consumption parameters; determining a detergent consumption amount of the clothing treatment apparatus based on the operation information; calculating a detergent remaining amount of the clothing treatment apparatus based on the detergent consumption amount; and selectively prompting that the detergent is insufficient through a reminder device based on a calculation result.

In a preferred technical solution of the control method described above, the step of "determining operation information of the clothing treatment apparatus based on the electricity consumption parameters" specifically includes: determining a water inflow duration of a washing stage of the clothing treatment apparatus based on the electricity consumption parameters; and the step of "determining a detergent consumption amount of the clothing treatment apparatus based on the operation information" specifically includes: determining the detergent consumption amount based on the water inflow duration.

In a preferred technical solution of the control method described above, the control method further includes: obtaining a total detergent capacity of the clothing treatment apparatus; in which the total detergent capacity is predetermined.

In a preferred technical solution of the control method described above, the total detergent capacity is predetermined based on a model of the clothing treatment apparatus, or the total detergent capacity is input in advance.

In a preferred technical solution of the control method described above, the step of "calculating a detergent remaining amount of the clothing treatment apparatus based on the detergent consumption amount" specifically includes: calculating the detergent remaining amount based on the total detergent capacity and the detergent consumption amount of the clothing treatment apparatus, and the step of "selectively prompting that the detergent is insufficient through a reminder device based on a calculation result" specifically includes: comparing the detergent remaining amount with a warning value; and prompting that the detergent is insufficient through the reminder device if the detergent remaining amount is smaller than the warning value.

In a preferred technical solution of the control method described above, the control method further includes: determining a fouling coefficient of the clothing treatment apparatus based on the operation information; and selectively prompting cleaning of the clothing treatment apparatus through the reminder device based on the fouling coefficient.

In a preferred technical solution of the control method described above, the step of "determining operation information of the clothing treatment apparatus based on the electricity consumption parameters" specifically includes: determining a washing duration of each time, a heating temperature of each time, and an interval time between two consecutive times of washing of the clothing treatment apparatus based on the electricity consumption parameters; and the step of "determining a fouling coefficient of the clothing treatment apparatus based on the operation information" specifically includes: determining a corresponding washing duration influence coefficient $A_i$, heating temperature influence coefficient $B_i$, and influence coefficient $C_i$ of the interval time between two consecutive times of washing based on the washing duration of each time, the heating temperature of each time and the interval time between two consecutive times of washing; and calculating the fouling coefficient S according to the following formula:

$$S = \sum_{i=1}^{n} A_i \times B_i \times C_i,$$

where $A_i$ is the washing duration influence coefficient for the $i^{th}$ time of washing, $B_i$, is the heating temperature influence coefficient for the $i^{th}$ time of washing, and $C_i$ is the influence coefficient of the interval time between the $i^{th}$ time of washing and the previous time of washing.

In a preferred technical solution of the control method described above, the step of "selectively prompting cleaning of the clothing treatment apparatus through the reminder device based on the fouling coefficient" specifically includes: selectively prompting cleaning of the clothing treatment apparatus through the reminder device, if the fouling coefficient is larger than a preset value.

In a preferred technical solution of the control method described above, the electricity consumption parameter is an electricity consumption power.

In a preferred technical solution of the control method described above, the reminder device is a buzzer, a voice broadcasting device and a display screen that are arranged on the smart socket, or a smart terminal communicatively connected with the smart socket.

It can be understood by those skilled in the art that in the technical solutions of the present disclosure, the smart home system includes a smart socket and a clothing treatment apparatus, and the clothing treatment apparatus is electrically connected with the smart socket; the control method includes: detecting electricity consumption parameters of the clothing treatment apparatus through the smart socket; determining operation information of the clothing treatment apparatus based on the electricity consumption parameters; determining a detergent consumption amount of the clothing treatment apparatus based on the operation information; calculating a detergent remaining amount of the clothing treatment apparatus based on the detergent consumption amount; and selectively prompting that the detergent is insufficient through a reminder device based on a calculation result.

The electricity consumption parameters of the clothing treatment apparatus are detected through the smart socket electrically connected with the clothing treatment apparatus, the operation information of the clothing treatment apparatus is determined based on the electricity consumption parameters, the detergent consumption amount of the clothing treatment apparatus is determined based on the operation information of the clothing treatment apparatus, the detergent remaining amount of the clothing treatment apparatus is calculated based on the detergent consumption amount, and it is selectively prompted that the detergent is insufficient through the reminder device based on the calculated detergent remaining amount, so that users can find that the detergent is insufficient and replenish it in a timely manner, thus avoiding a situation in which users use the clothing treatment apparatus to wash the clothing without finding that the detergent remaining amount is insufficient so that the clothing cannot be washed clean, and optimizing the use experience for users. In addition, users do not need to replace the existing non-IoT clothing treatment apparatuses with IoT clothing treatment apparatuses, and can experience the convenience brought by the Internet of Things (IoT) on the basis of the existing non-IoT clothing treatment apparatuses, thus reducing use cost.

BRIEF DESCRIPTION OF DRAWINGS

Preferred embodiments of the present disclosure will be described below with reference to the accompanying drawings and in connection with a washing machine; in the drawings.

DETAILED DESCRIPTION

First, it should be understood by those skilled in the art that the embodiments described below are only intended to explain the technical principles of the present disclosure, and are not intended to limit the scope of protection of the present disclosure. For example, although the control method for the smart home system is explained in the present disclosure in connection with a washing machine, the technical solutions of the present disclosure are not limited to this. The control method for the smart home system of the present disclosure is obviously also applicable to clothing treatment apparatuses such as washing-drying integrated machines and shoe washers.

It should be noted that in the description of the present disclosure, unless otherwise clearly specified and defined, terms "install", "arrange", "connect" and "connection" should be understood in a broad sense; for example, the connection may be a fixed connection, or may also be a detachable connection, or an integral connection; it may be a mechanical connection, or an electrical connection; it may be a direct connection, or an indirect connection implemented through an intermediate medium, or it may be internal communication between two elements. For those skilled in the art, the specific meaning of the above terms in the present disclosure can be interpreted according to specific situations. In addition, terms "first" and "second" are only used for descriptive purposes, and should not be interpreted as indicating or implying relative importance.

Figure 1:
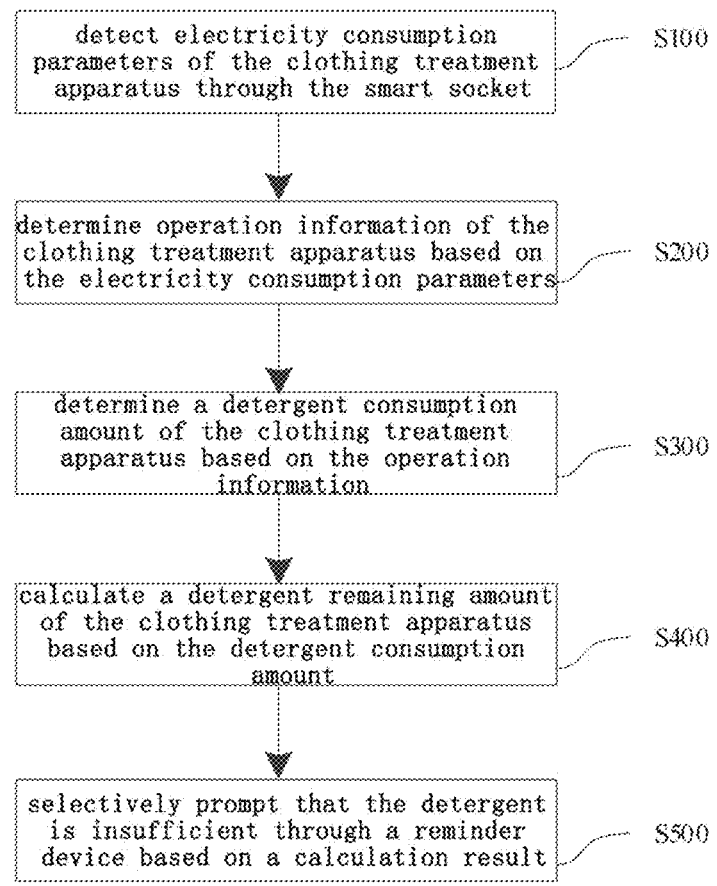
FIG. 1 is a flowchart of a control method for a smart home system of the present disclosure.

The control method for the smart home system of the present disclosure will be described with reference to FIG. 1, which is a flowchart of the control method for the smart home system of the present disclosure.

In view of the problem pointed out in the "BACKGROUND" that existing non-IoT washing machines are not able to timely remind replenishment of the detergent, the present disclosure provides a control method for a smart home system; the smart home system includes a smart socket and a clothing treatment apparatus, and the clothing treatment apparatus is electrically connected with the smart socket. As shown in FIG. 1, the control method for the smart home system mainly includes the following steps:

step S100: detecting electricity consumption parameters of the clothing treatment apparatus through the smart socket;

step S200: determining operation information of the clothing treatment apparatus based on the electricity consumption parameters;

step S300: determining a detergent consumption amount of the clothing treatment apparatus based on the operation information;

step S400: calculating a detergent remaining amount of the clothing treatment apparatus based on the detergent consumption amount; and step S500: selectively prompting that the detergent is insufficient through a reminder device based on a calculation result.

The smart home system includes a server, which may be a cloud server or a background server. The smart socket includes a storage module, a detection module, and a sending module. The server is communicatively connected with the sending module and a smart terminal which serves as the reminder device, respectively, such as by means of a wide area network, a local area network, WiFi, "WiFi+router accessed by Internet", Bluetooth, ZIGBEE, NFC, GPRS, and other communication means. The smart terminal may be a mobile device, a computer, an on-vehicle device built into floating cars, and the like, or any combination thereof. In some embodiments, the mobile device may include a mobile phone, a tablet, a smart home device, a wearable device, a smart mobile device, a virtual reality device and the like, or any combination thereof. The storage module of the smart socket pre stores the detergent consumption amount and the total detergent capacity of a single-time washing of clothing of the clothing treatment apparatus. The detection module is configured to detect the electricity consumption parameters of the clothing treatment apparatus in real time, such as electricity consumption current and electricity consumption power. The sending module is configured to send the detected electricity consumption parameters, and the detergent consumption amount and the total detergent capacity of a single-time washing of clothing of the clothing treatment apparatus stored in the storage module, to the server. The server determines whether the clothing treatment apparatus has performed a washing operation based on a result of comparison between the electricity consumption current or the electricity consumption power with a current threshold or a power threshold, thereby calculating the times of washing of the clothing treatment apparatus. The current detergent consumption amount is obtained by multiplying the detergent consumption amount of a single-time washing of clothing with the times of washing, and the detergent consumption amount is subtracted from the total detergent capacity to obtain the detergent remaining amount, which is then compared with a warning value. If the detergent remaining amount is smaller than the warning value, the server will send an instruction to the smart terminal. After receiving the instruction, the smart terminal will display prompt information of insufficient detergent to the user in the form of voice, text or image, so that the user can find that the detergent is insufficient and supplement it in a timely manner, thus optimizing the user experience for users.

It can be understood by those skilled in the art that the reminder device can also be a buzzer, a voice broadcasting device, a display screen, an indicator light and the like that are arranged on the smart socket. The server sends an instruction to the smart socket, so that the buzzer, the voice broadcasting device, the display screen, the indicator light and the like send prompt information in a corresponding manner. In addition, in a feasible embodiment, the smart home system may not include a server; instead, a smart chip serving as a processor is arranged on the smart socket. The smart chip is communicatively connected with the sending module and the smart terminal which serves as the reminder device, and the smart chip replaces the server to perform its corresponding operations.

Preferably, step S200 specifically includes determining a water inflow duration of a washing stage of the clothing treatment apparatus based on the electricity consumption parameters, and step S300 specifically includes determining the detergent consumption amount based on the water inflow duration. Due to the different amount of clothing at each time of washing, for some clothing treatment apparatuses that are smarter, the amount of clothing to be washed can be determined by weighing, and corresponding amounts of washing water and detergent are injected according to the amount of clothing to be washed. The amount of detergent consumed at each time of washing will also vary. Based on the electricity consumption parameters, the water inflow duration of the washing stage of the clothing treatment apparatus is determined, and a water inflow amount is determined based on the water inflow duration; further, the detergent consumption amount at each time of washing is determined based on a correspondence between the water inflow amount and a dispensed amount of detergent. The detergent consumption amount obtained by adding up the detergent consumption amount at each time of washing is more accurate, so that a more accurate detergent remaining amount can be obtained. Therefore, it can be judged accurately that the detergent is insufficient and prompt information of insufficient detergent can be sent.

A first embodiment of the present disclosure will be described in detail below by using a washing machine as an example with reference to FIG. 2, which is a specific step diagram of the control method for the smart home system in the first embodiment of the present disclosure.

Figure 2:
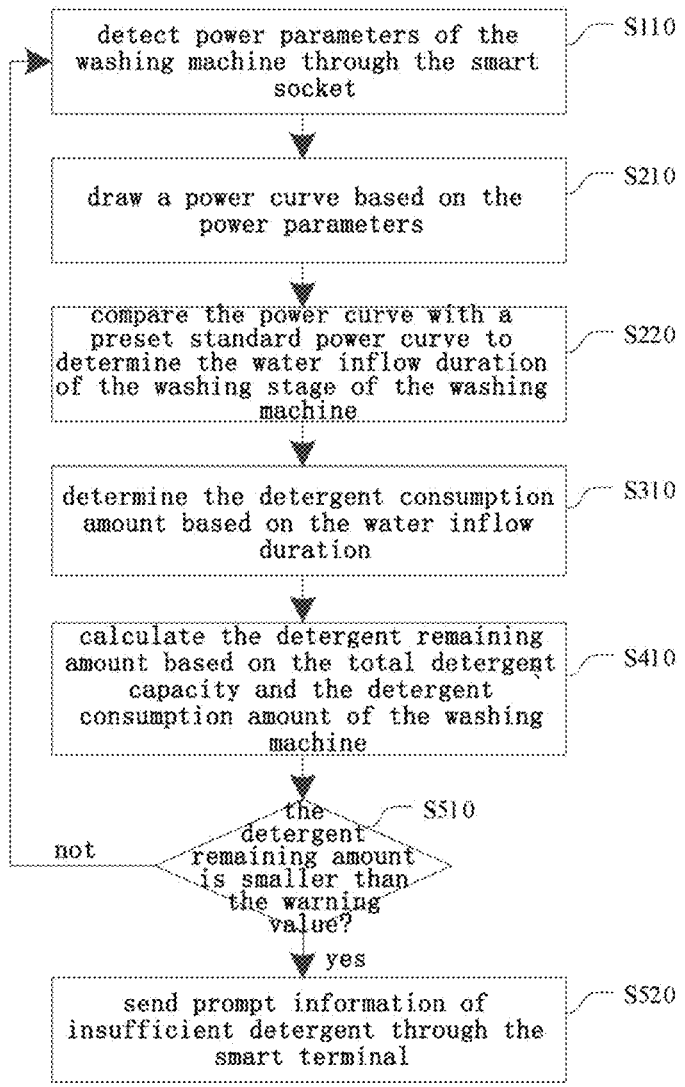
FIG. 2 is a specific step diagram of the control method for the smart home system in a first embodiment of the present disclosure.

As shown in FIG. 2, the control method for the smart home system includes the following steps:

S110: detecting power parameters of the washing machine through the smart socket.

The detection module of the smart socket includes a power meter which is configured to detect the power parameters of the washing machine in real time, and the sending module sends the power parameters of the washing machine to the server. It can be understood that the detection module of the smart socket may also include a voltage sensor and a current sensor, which can detect a real-time voltage and a real-time current of the washing machine in real time, so that a real-time power can be obtained by calculating the product of the real-time voltage and the real-time current.

S210: drawing a power curve based on the power parameters.

The server draws a power curve in which the power changes over time based on the received power parameters of the washing machine.

S220: comparing the power curve with a preset standard power curve to determine the water inflow duration of the washing stage of the washing machine.

The server compares the drawn power curve with the preset standard power curve. When a certain segment of the drawn power curve matches a certain segment of the preset standard power curve, it is determined that the washing machine was performing a corresponding operation during that time period, such as water inflow operation, washing operation, heating operation, rinsing operation, or draining operation, etc., so that the water inflow duration of the washing stage is determined through comparison.

S310: determining the detergent consumption amount based on the water inflow duration.

The server determines the water inflow amount based on the water inflow duration. For example, the corresponding water inflow amount can be determined by looking up a mapping relationship table between the water inflow duration and the water inflow amount. Alternatively, the corresponding water inflow amount can be obtained by multiplying the water inflow duration with a first preset coefficient, and the weight of clothing can be determined based on the water inflow amount. For example, the corresponding weight of clothing can be determined by looking up a mapping relationship table between the water inflow amount and the weight of clothing, or the weight of clothing can be calculated according to the water inflow amount based on a functional relationship between the water inflow amount and the weight of clothing. The detergent consumption amount is determined based on the weight of clothing. For example, the corresponding detergent consumption amount can be determined by looking up a mapping relationship table between the detergent consumption amount and the weight of clothing, and the detergent consumption amount can be obtained by adding up the detergent consumption amount at each time of washing.

S410: calculating the detergent remaining amount based on the total detergent capacity and the detergent consumption amount of the washing machine.

For example, when the washing machine is used for the first time, the server sends an instruction of inputting the total detergent capacity to the smart terminal. The smart terminal displays prompt information of inputting the total detergent capacity to the user. The user inputs the total detergent capacity information of the washing machine into the smart terminal, and the smart terminal sends the total detergent capacity information of the washing machine to the server. The server calculates the current detergent remaining amount based on the total detergent capacity information and the detergent consumption amount. It can be understood that in another feasible embodiment, it is also possible that the total detergent capacities of various models of washing machines are stored in the server. When the washing machine is used for the first time, the server sends an instruction of inputting model information of the washing machine to the smart terminal, and the smart terminal prompts the user to output the model information of the washing machine. After the user views the model of the washing machine, the model information of the washing machine is input into the smart terminal, the smart terminal sends the model information of the washing machine to the server, and the server determines the total detergent capacity of the washing machine based on the obtained model information of the washing machine.

S510: judging whether the detergent remaining amount is smaller than the warning value; if yes, proceeding to step S520; and if not, returning to step S110.

The server compares the detergent remaining amount with the warning value. If the detergent remaining amount is smaller than the warning value, the server will send an instruction of promoting that the detergent is insufficient to the smart terminal. If the detergent remaining amount is not smaller than the warning value, the server will not send an instruction of promoting that the detergent is insufficient to the smart terminal.

S520: sending prompt information of insufficient detergent through the smart terminal.

The smart terminal displays the prompt information of insufficient detergent in one or more of the forms of text, voice, chart and the like based on the received instruction of prompting that the detergent is insufficient.

The power parameters of the washing machine are detected through the smart socket, the power curve is drawn based on the power parameters, the power curve is compared with the preset standard power curve to determine the water inflow duration of the washing stage of the washing machine, the water inflow amount is determined based on the water inflow duration, the weight of clothing is determined based on the water inflow amount, the detergent consumption amount is determined based on the weight of clothing, and then the detergent remaining amount is calculated based on the total detergent capacity and the detergent consumption amount of the washing machine, so that the overall detergent consumption amount and the detergent remaining amount can be obtained more accurately, and the prompt information of insufficient detergent can be sent accurately.

It can be understood by those skilled in the art that determining the water inflow duration of the washing stage of the washing machine by drawing the power curve based on the power parameters and comparing the power curve with the preset standard power curve is only a specific embodiment. Those skilled in the art can also adjust it according to the actual situation. For example, in another feasible embodiment, it is judged whether the power parameters are within a preset range; a water inflow valve is opened during the water inflow process, and the electricity consumption power of the washing machine remains basically constant. A difference between this power and the power at the time of the washing operation, spinning operation and draining operation of the washing machine is large. By judging whether the electricity consumption power is within the preset power range, it is judged whether the washing machine is in the water inflow stage, and the water inflow duration in this water inflow stage is calculated.

In addition, determining the water inflow duration of the washing stage of the washing machine by comparing the power curve with the preset standard power curve, determining the water inflow amount based on the water inflow duration, determining the weight of clothing based on the water inflow amount and determining the detergent consumption amount based on the weight of clothing is also a specific embodiment. Those skilled in the art can adjust it as required. For example, in a feasible embodiment, the power curve is compared with the preset standard power curve to determine a drainage duration of the washing stage of the washing machine, the amount of washing water is determined based on the drainage duration, the weight of clothing is determined based on the amount of washing water, and the detergent consumption amount is determined based on the weight of clothing.

In addition, using the power parameters as the electricity consumption parameters is also a specific embodiment. Those skilled in the art can also use the current parameter as the electricity consumption parameter. The detection module in the smart socket includes a current sensor, which is configured to detect a real-time current of the washing machine. The server draws a current curve in which the current changes over time based on the current parameter, compares the current curve with a preset standard current curve to determine the water inflow duration of the washing stage of the washing machine, determines the water inflow amount based on the water inflow duration, determines the weight of clothing based on the water inflow amount, determines the detergent consumption amount based on the weight of clothing, calculates the detergent remaining amount based on the total detergent capacity and the detergent consumption amount of the washing machine, and compares the detergent remaining amount with a warning value. If the detergent remaining amount is smaller than the warning value, the server will send an instruction of prompting that the detergent is insufficient to the smart terminal, and the smart terminal will send prompt information of insufficient detergent to the user.

For non-IoT washing machines, the usage habits and frequency of washing the clothing are also different for different users, and a cleaning cycle of the washing machine will also vary. Users cannot accurately judge when the washing machine needs to be cleaned. Washing the clothing when the washing machine is dirty and needs to be cleaned will seriously affect the washing effect of the clothing. In view of this, the control method for the smart home system of the present disclosure can also send a cleaning prompt when the washing machine reaches a certain degree of fouling.

A second embodiment of the present disclosure will be described in detail below with reference to FIG. 3, which is a specific step diagram of the control method for the smart home system in the second embodiment of the present disclosure.

Figure 3:
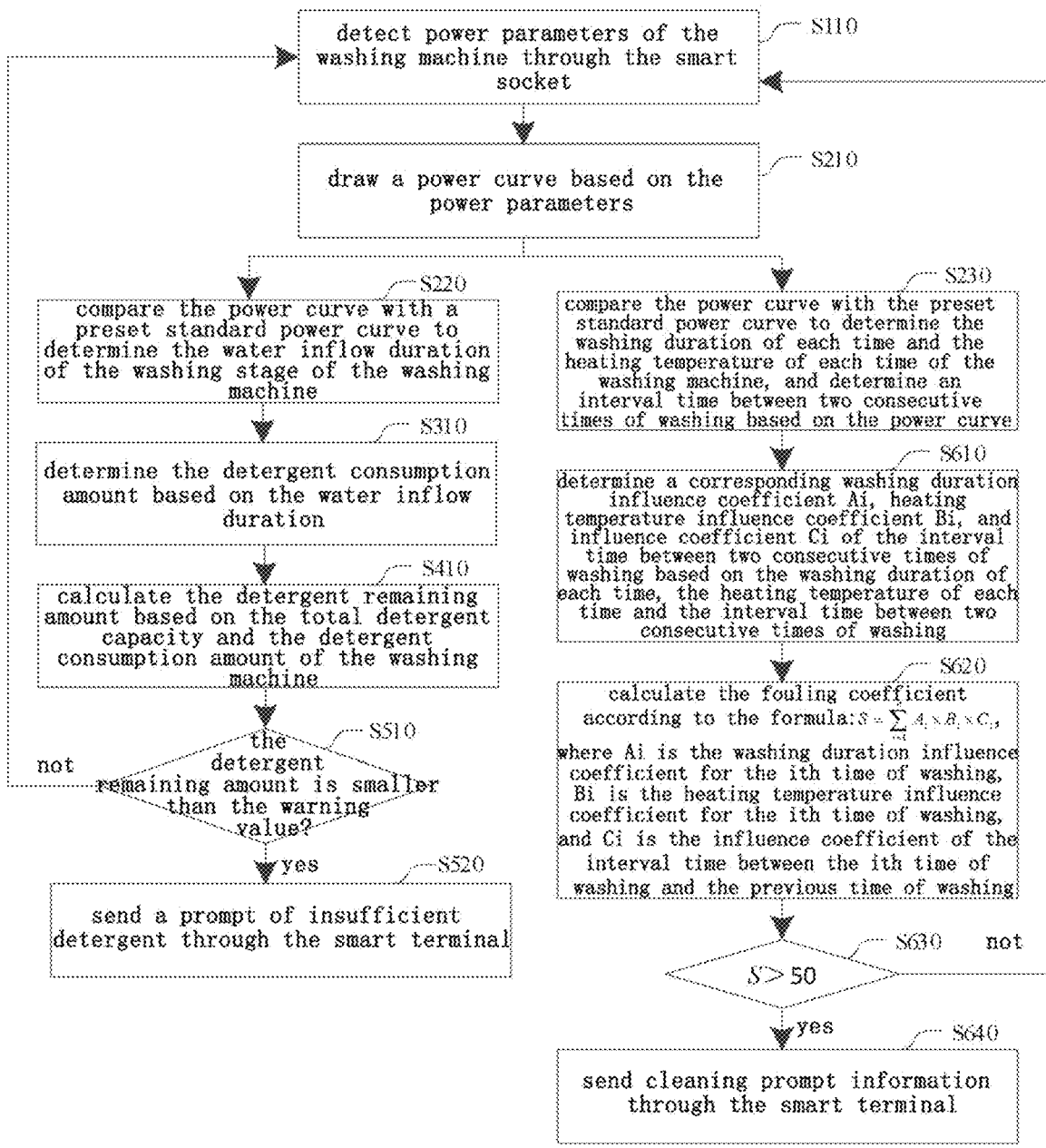
FIG. 3 is a specific step diagram of the control method for the smart home system in a second embodiment of the present disclosure.

As shown in FIG. 3, on the basis of the first embodiment, the control method for the smart home system in the second embodiment further includes the following steps after step S210:

Step S230: comparing the power curve with the preset standard power curve to determine the washing duration of each time and the heating temperature of each time of the washing machine, and determining an interval time between two consecutive times of washing based on the power curve.

The server compares the drawn power curve with the preset standard power curve. When a certain segment of the drawn power curve matches a certain segment of the preset standard power curve, it is determined that the washing machine was performing a water inflow operation, a washing operation, a heating operation, a rinsing operation, or a draining operation and the like during that time period. Based on the power curve, an execution duration of the corresponding operation is determined, so as to obtain the washing duration and heating duration of each time. The washing machines are usually provided with multiple levels of heating temperatures, and different heating powers and heating durations are used for different levels of heating temperatures, such as those shown in Table 1 below:

TABLE 1

| heating temperature (° C.) | heating power (W) | heating duration (min) |
|---|---|---|
| 30 | 1600 | 2 |
| 60 | 1700 | 4 |
| 90 | 2000 | 8 |

The server can obtain the corresponding heating temperature based on the correspondence among the stored heating temperature, heating power and heating duration, as well as the determined heating power and heating duration. The server determines a start time point and an end time point of each time of washing based on the power curve, and determines the interval time between two consecutive times of washing based on the start time point of each time of washing and the end time point of the previous time of washing.

Step S610: determining a corresponding washing duration influence coefficient $A_i$, heating temperature influence coefficient $B_i$, and influence coefficient $C_i$ of the interval time between two consecutive times of washing based on the washing duration of each time, the heating temperature of each time and the interval time between two consecutive times of washing.

A mapping relationship table between the washing duration and the washing duration influence coefficient, a mapping relationship table between the heating temperature and the heating temperature influence coefficient, and a mapping relationship table between the interval time between two consecutive times of washing and the influence coefficient of the interval time between two consecutive times of washing are stored in the server. The degree of fouling on the washing machine is positively correlated with the washing duration. For example, the washing duration influence coefficient corresponding to the washing duration of (0, 20] minutes can be set as 0.5, the washing duration influence coefficient corresponding to the washing duration of (20, 40] minutes can be set as 0.7, and the washing duration influence coefficient corresponding to the washing duration of (40, 60] minutes can be set as 0.9. The washing water has an influence on the ability of the detergent to remove bacteria and scale at different temperatures. Therefore, at the optimal washing temperature, the contribution value to the degree of fouling on the washing machine is the smallest. For example, the heating temperature coefficient corresponding to the heating temperature of (0, 10]° C. can be set as 0.9, the heating temperature coefficient corresponding to the heating temperature of (10, 20]° C. can be set as 0.85, the heating temperature coefficient corresponding to the heating temperature of (20, 30]° C. can be set as 0.65, the heating temperature coefficient corresponding to the heating temperature of (30, 40]° C. can be set as 0.45, the heating temperature coefficient corresponding to the heating temperature of (40, 50]° C. can be set as 0.55, the heating temperature coefficient corresponding to the heating temperature of (50, 60]° C. can be set as 0.65, the heating temperature coefficient corresponding to the heating temperature of (60, 70]° C. can be set as 0.8, and the heating temperature coefficient corresponding to the heating temperature of (70, 80]° C. can be set as 0.9. The longer the interval time between two consecutive times of washing, the stronger the adhesion strength of the adhered stains in the washing machine, making it more difficult to clean the stains during the washing operation. Therefore, the influence coefficient of the interval time between two consecutive times of washing is positively correlated with the interval time between two consecutive times of washing. For example, the influence coefficient of the interval time between two consecutive times of washing corresponding to the interval time of (0, 2] hours between two consecutive times of washing can be set as 0.3, the influence coefficient of the interval time between two consecutive times of washing corresponding to the interval time of (2, 6] hours between two consecutive times of washing can be set as 0.5, the influence coefficient of the interval time between two consecutive times of washing corresponding to the interval time of (6, 10] hours between two consecutive times of washing can be set as 0.8, and the influence coefficient of the interval time between two consecutive times of washing corresponding to the interval time of (10, +∞] hours between two consecutive times of washing can be set as 1. For the first time of washing, since no washing operation has been performed before, $C_1$ can be set as $C_1$=0.1. Of course, those skilled in the art can also adaptively adjust the value of $C_1$ based on other coefficients. It can be understood that determining the corresponding washing duration influence coefficient, heating temperature influence coefficient and influence coefficient of the interval time between two consecutive times of washing based on the washing duration of each time, the heating temperature of each time, the interval time between two consecutive times of washing and the corresponding mapping relationship tables is only a specific arrangement. Those skilled in this art can also use a change curve of the washing duration influence coefficient and the washing duration, a change curve of the heating temperature influence coefficient and the heating temperature, and a change curve of the influence coefficient of the interval time between two consecutive times of washing and the interval time between two consecutive times of washing to obtain the corresponding influence coefficients through interpolation. The corresponding influence coefficients can also be calculated by using the corresponding fitting formula.

Step S620: calculating the fouling coefficient S according to the following formula:

$$S = \sum_{i=1}^{n} A_i \times B_i \times C_i,$$

where $A_i$ is the washing duration influence coefficient for the $i^{th}$ time of washing, $B_i$ is the heating temperature influence coefficient for the $i^{th}$ time of washing, and $C_i$ is the influence coefficient of the interval time between the $i^{th}$ time of washing and the previous time of washing.

Step S630: judging whether the fouling coefficient S is larger than a preset value of 50; if yes, proceeding to step S640; and if not, returning to step S110.

The server compares the fouling coefficient S with the preset value of 50. If the fouling coefficient S is larger than the preset value of 50, a cleaning prompt instruction will be sent to the smart terminal. Otherwise, no cleaning prompt instruction will be sent to the smart terminal.

Step S640: sending cleaning prompt information through the smart terminal.

The smart terminal displays the cleaning prompt information in one or more of the forms of text, voice, chart and the like based on the received cleaning prompt instruction. When users receive the cleaning prompt information through the mobile terminal, they can clean the washing machine by themselves or contact after-sales personnel for professional cleaning.

The electricity consumption parameters of the washing machine are detected through the smart socket, the operation information of the washing machine is judged based on the electricity consumption parameters, and it is further judged whether cleaning is required based on the operation information of the washing machine, so that cleaning prompt information can be sent when the washing machine needs to be cleaned. This enables users to know in a timely manner that the washing machine needs to be cleaned, so that users can clean the washing machine by themselves or contact after-sales personnel for professional cleaning of the washing machine, which solves the problem that existing non-IoT washing machines are not able to remind users to timely clean the washing machine, and optimizes the user experience for users.

Through the combined influences of the washing duration, the heating temperature, and the interval time between two consecutive times of washing, it is possible to more accurately judge whether the washing machine needs to be cleaned.

It can be understood by those skilled in the art that the above embodiments are only preferred embodiments. Those skilled in the art can also determine a cumulative washing duration through the detected electricity consumption parameters, and judge whether the cumulative duration is larger than a preset duration. If the cumulative duration is larger than the preset duration, cleaning prompt information will be sent through the smart terminal.

It can be seen from the above description that in the technical solutions of the present disclosure, the electricity consumption parameters of the clothing treatment apparatus are detected through the smart socket electrically connected with the clothing treatment apparatus, the operation information of the clothing treatment apparatus is determined based on the electricity consumption parameters, the detergent consumption amount of the clothing treatment apparatus is determined based on the operation information of the clothing treatment apparatus, the detergent remaining amount of the clothing treatment apparatus is calculated based on the detergent consumption amount, and it is selectively prompted that the detergent is insufficient through the reminder device based on the calculated detergent remaining amount, so that users can find that the detergent is insufficient and replenish it in a timely manner, thus avoiding a situation in which users use the clothing treatment apparatus to wash the clothing without finding that the detergent remaining amount is insufficient so that the clothing cannot be washed clean, and optimizing the use experience for users. The electricity consumption parameters of the washing machine are detected through the smart socket, the operation information of the washing machine is judged based on the electricity consumption parameters, and it is further judged whether cleaning is required based on the operation information of the washing machine, so that cleaning prompt information can be sent when the washing machine needs to be cleaned. This enables users to know in a timely manner that the washing machine needs to be cleaned, so that users can clean the washing machine by themselves or contact after-sales personnel for professional cleaning of the washing machine, which solves the problem that existing non-IoT washing machines are not able to remind users to timely clean the washing machine, and optimizes the user experience for users. In addition, users do not need to replace the existing non-IoT clothing treatment apparatuses with IoT clothing treatment apparatuses, and can experience the convenience brought by the Internet of Things (IoT) on the basis of the existing non-IoT clothing treatment apparatuses, thus reducing use cost.

It can be understood by those skilled in the art that although some embodiments described herein include certain features included in other embodiments rather than other features, combinations of features of different embodiments mean that they are within the scope of the present disclosure and form different embodiments. For example, in the claims of the present disclosure, any of the claimed embodiments can be used in any combination.

Hitherto, the technical solutions of the present disclosure have been described in connection with the preferred embodiments shown in the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. A control method for a smart home system, wherein the smart home system comprises a smart socket and a clothing treatment apparatus, and the clothing treatment apparatus is electrically connected with the smart socket; the control method comprises:
   detecting electricity consumption parameters of the clothing treatment apparatus through the smart socket;
   determining operation information of the clothing treatment apparatus based on the electricity consumption parameters;

determining a detergent consumption amount of the clothing treatment apparatus based on the operation information;

calculating a detergent remaining amount of the clothing treatment apparatus based on the detergent consumption amount; and selectively prompting that the detergent is insufficient through a reminder device based on a calculation result.

2. The control method according to claim 1, wherein the step of determining operation information of the clothing treatment apparatus based on the electricity consumption parameters further comprises:

determining a water inflow duration of a washing stage of the clothing treatment apparatus based on the electricity consumption parameters; and the step of determining a detergent consumption amount of the clothing treatment apparatus based on the operation information further comprises:

determining the detergent consumption amount based on the water inflow duration.

3. The control method according to claim 1, further comprising:

obtaining a total detergent capacity of the clothing treatment apparatus;

wherein the total detergent capacity is predetermined.

4. The control method according to claim 3, wherein the total detergent capacity is predetermined based on a model of the clothing treatment apparatus, or the total detergent capacity is input in advance.

5. The control method according to claim 3, wherein the step of calculating a detergent remaining amount of the clothing treatment apparatus based on the detergent consumption amount further comprises:

calculating the detergent remaining amount based on the total detergent capacity and the detergent consumption amount of the clothing treatment apparatus; and the step of selectively prompting that the detergent is insufficient through a reminder device based on a calculation result further comprises:

comparing the detergent remaining amount with a warning value; and prompting that the detergent is insufficient through the reminder device if the detergent remaining amount is smaller than the warning value.

6. The control method according to claim 1, further comprising:

determining a fouling coefficient of the clothing treatment apparatus based on the operation information; and selectively prompting cleaning of the clothing treatment apparatus through the reminder device based on the fouling coefficient.

7. The control method according to claim 6, wherein the step of determining operation information of the clothing treatment apparatus based on the electricity consumption parameters further comprises:

determining a washing duration of each time, a heating temperature of each time, and an interval time between two consecutive times of washing of the clothing treatment apparatus based on the electricity consumption parameters; and the step of determining a fouling coefficient of the clothing treatment apparatus based on the operation information further comprises:

determining a corresponding washing duration influence coefficient $A_i$, heating temperature influence coefficient $B_i$, and influence coefficient $C_i$ of the interval time between two consecutive times of washing based on the washing duration of each time, the heating temperature of each time and the interval time between two consecutive times of washing; and calculating the fouling coefficient S according to the following formula:

$$S = \sum_{i=1}^{n} A_i \times B_i \times C_i,$$

where $A_i$ is the washing duration influence coefficient for the $i^{th}$ time of washing, $B_i$ is the heating temperature influence coefficient for the $i^{th}$ time of washing, and $C_i$ is the influence coefficient of the interval time between the $i^{th}$ time of washing and the previous time of washing.

8. The control method according to claim 6, wherein the step of selectively prompting cleaning of the clothing treatment apparatus through the reminder device based on the fouling coefficient further comprises:

selectively prompting cleaning of the clothing treatment apparatus through the reminder device, if the fouling coefficient is larger than a preset value.

9. The control method according to claim 1, wherein the electricity consumption parameter is an electricity consumption power.

10. The control method according to claim 1, wherein the reminder device is a buzzer, a voice broadcasting device and a display screen that are arranged on the smart socket, or a smart terminal communicatively connected with the smart socket.

* * * * *